(12) United States Patent
Kroll et al.

(10) Patent No.: US 7,423,225 B1
(45) Date of Patent: Sep. 9, 2008

(54) WEIGH IN MOTION TECHNOLOGY

(75) Inventors: William P. Kroll, Medina, MN (US);
Randie Evenson, Blaine, MN (US);
Mathew C. Young, Golden Valley, MN
(US); Jason Wissink, Maple Grove, MN
(US)

(73) Assignee: Intercomp Company, Minneapolis, MN (US)

( * ) Notice: Subject to any disclaimer, the term of this patent is extended or adjusted under 35 U.S.C. 154(b) by 0 days.

(21) Appl. No.: 11/271,275

(22) Filed: Nov. 9, 2005

Related U.S. Application Data

(60) Provisional application No. 60/626,140, filed on Nov. 9, 2004.

(51) Int. Cl.
*G01G 19/02* (2006.01)

(52) U.S. Cl. .................................................. 177/132

(58) Field of Classification Search ......... 177/132–135, 177/211, 229; 73/862.621–862.642
See application file for complete search history.

(56) References Cited

U.S. PATENT DOCUMENTS

| 3,933,212 A | * | 1/1976 | Bradley et al. | 177/209 |
|---|---|---|---|---|
| 3,960,013 A | * | 6/1976 | Ormond | 177/211 |
| 3,999,621 A | * | 12/1976 | Wagner | 177/1 |
| 4,203,497 A | * | 5/1980 | Harris et al. | 177/134 |
| 4,266,624 A | * | 5/1981 | Nordstron et al. | 177/253 |
| 4,516,646 A | * | 5/1985 | Bergfalk | 177/211 |
| 4,804,052 A | * | 2/1989 | Griffen | 177/25.14 |
| 4,813,504 A | * | 3/1989 | Kroll | 177/21 |
| 4,815,547 A | * | 3/1989 | Dillon et al. | 177/25.14 |
| 4,979,581 A | * | 12/1990 | Kroll | 177/211 |
| 5,308,933 A | * | 5/1994 | Ahl | 177/135 |
| 6,552,278 B2 | * | 4/2003 | Johnson | 177/134 |
| 6,706,976 B1 | * | 3/2004 | Schuler | 177/126 |
| 6,919,516 B2 | * | 7/2005 | Frye et al. | 177/25.13 |

* cited by examiner

*Primary Examiner*—Randy W Gibson
(74) *Attorney, Agent, or Firm*—Skinner & Associates

(57) ABSTRACT

A weighing system has at least one weighing platform receiving a moving load to be weighed, the platform includes at least one scale member connected to at least two approach members, and including at least one ramp member connected to at least one of the approach members. An interface is communicatively connected to the scale member. A controller is connected to the interface. And, a power supply is connected to the interface. Also disclosed is a weighing scale having a rigid pad having a top surface for receiving the load and a bottom surface. A plurality of load cells are included, each having at least two top surfaces and at least two bottom surfaces. A top surface of each load cell is connected at a predetermined location to the bottom surface of the pad. A foot member contacts the ground and is connected to a bottom surface of the load cell. Further disclosed is a load cell having a body defined by first and second sides. The body has a peripheral region of a predetermined thickness and a central region of a predetermined thickness which is less than that of the peripheral region. The central region is inset on each side with respect to the peripheral region. The central region is adapted for contact with a force.

17 Claims, 21 Drawing Sheets

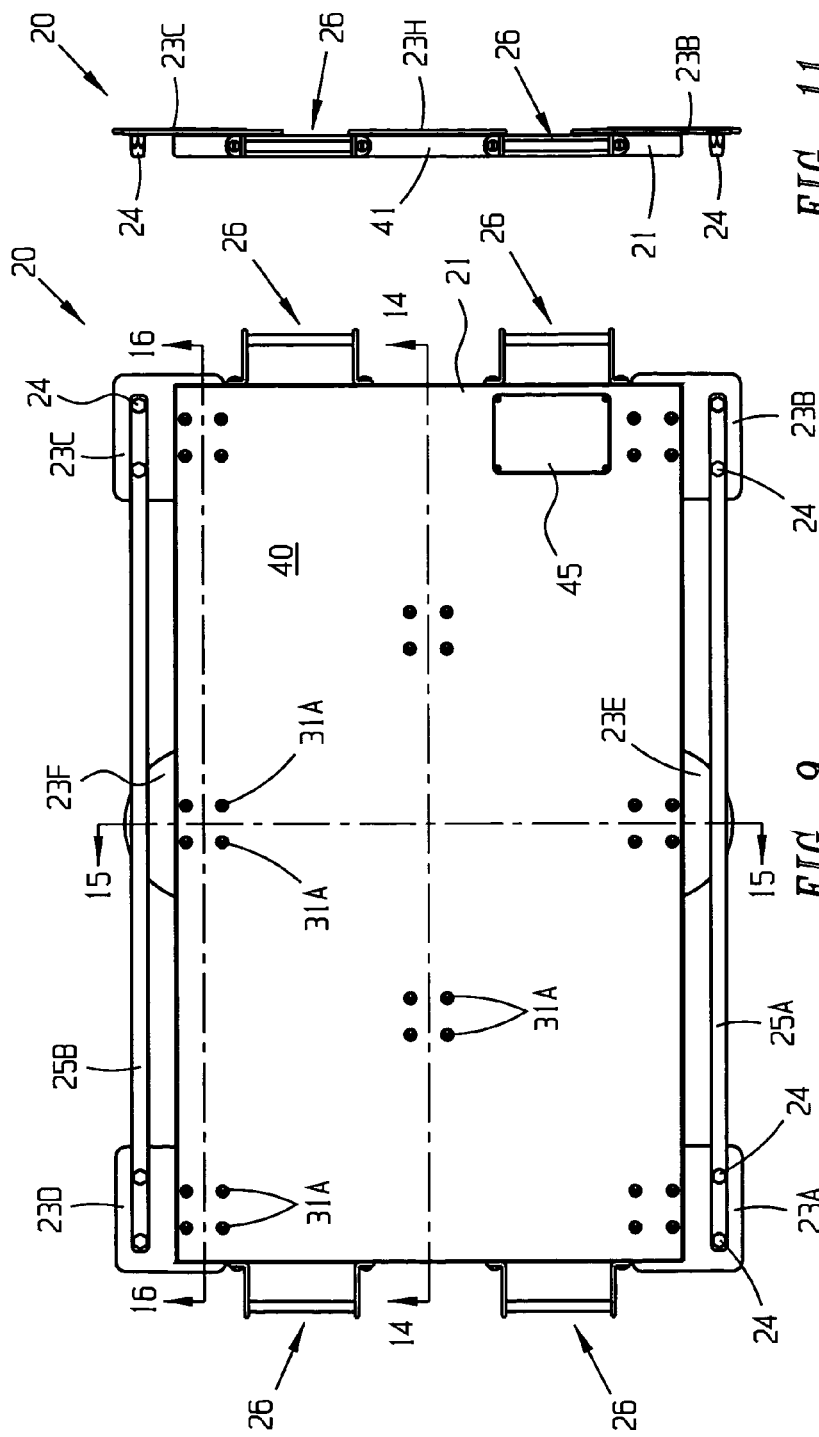
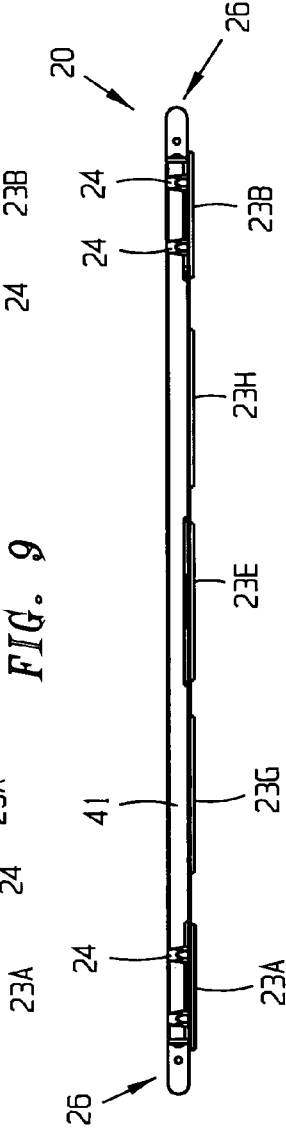
FIG. 9
FIG. 11
FIG. 10

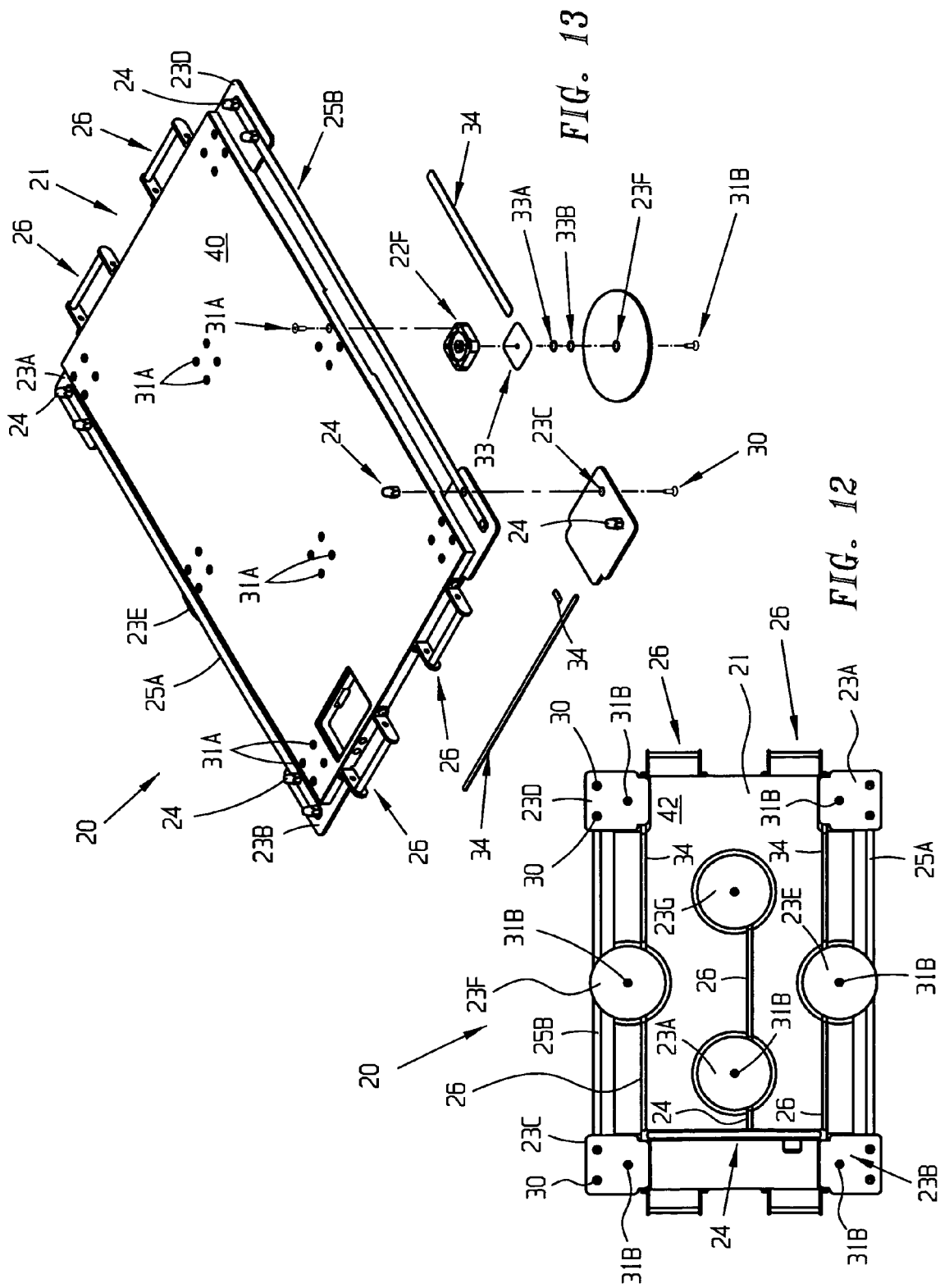

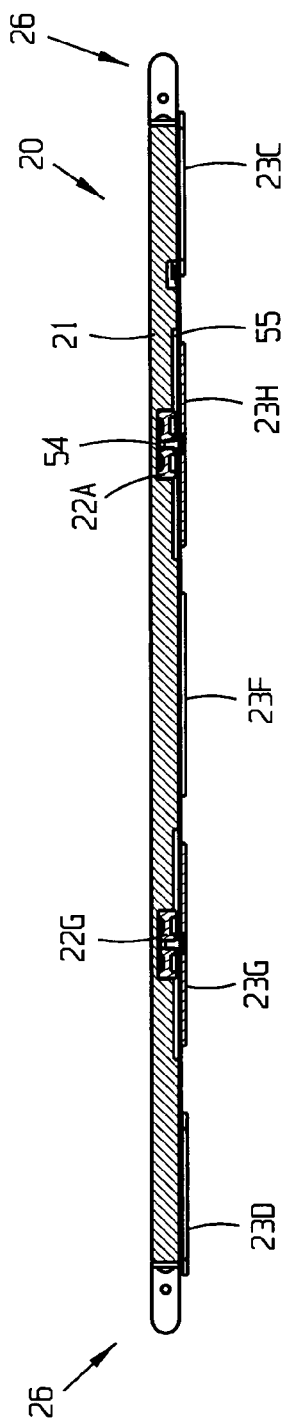
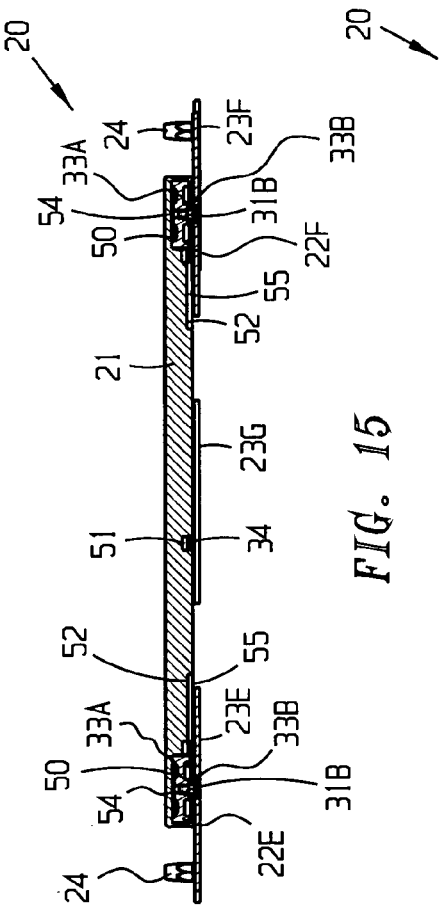
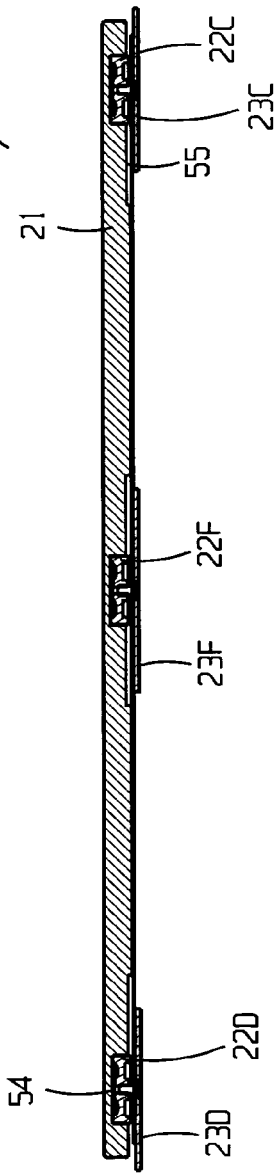
FIG. 14
FIG. 15
FIG. 16

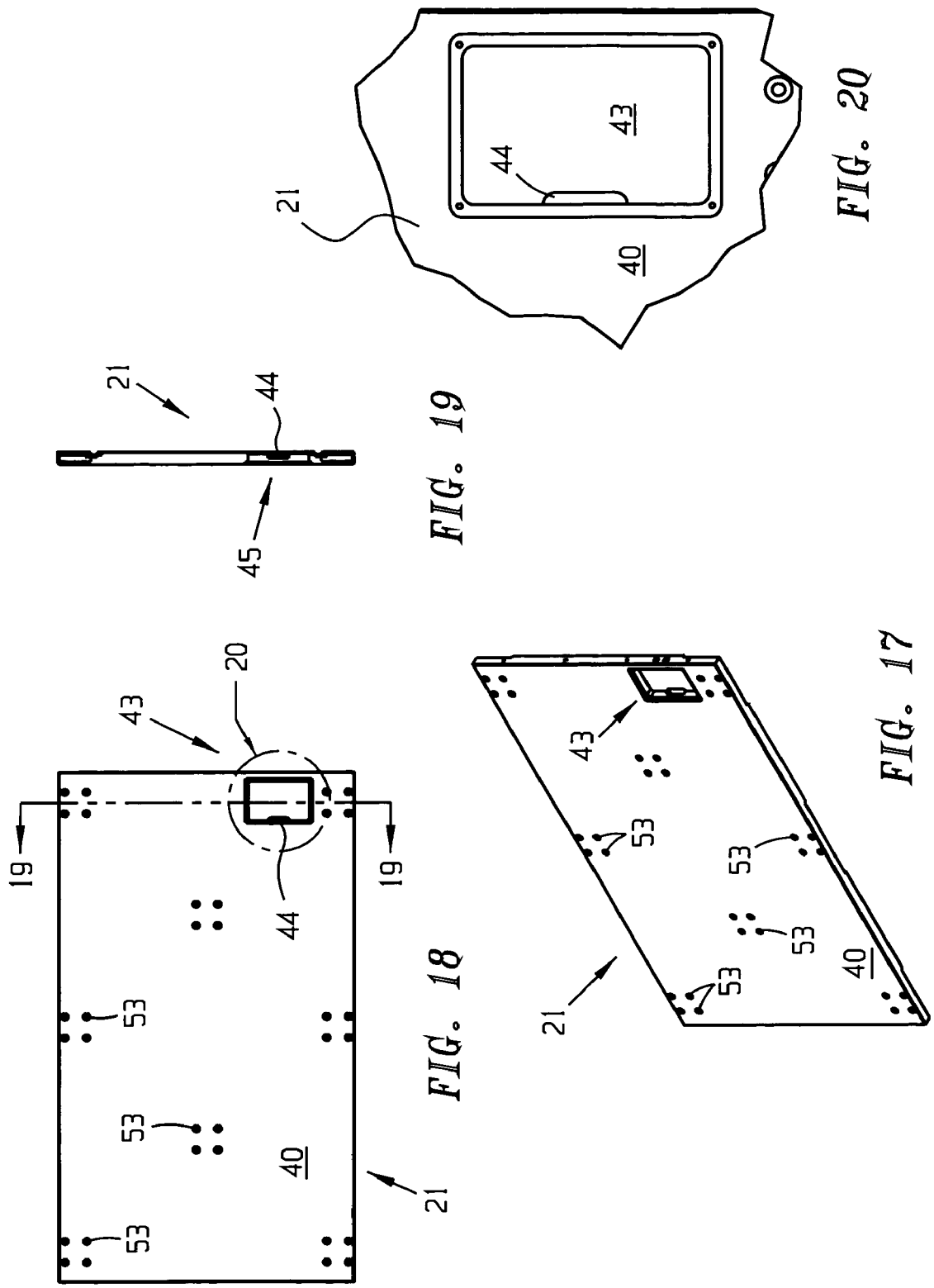

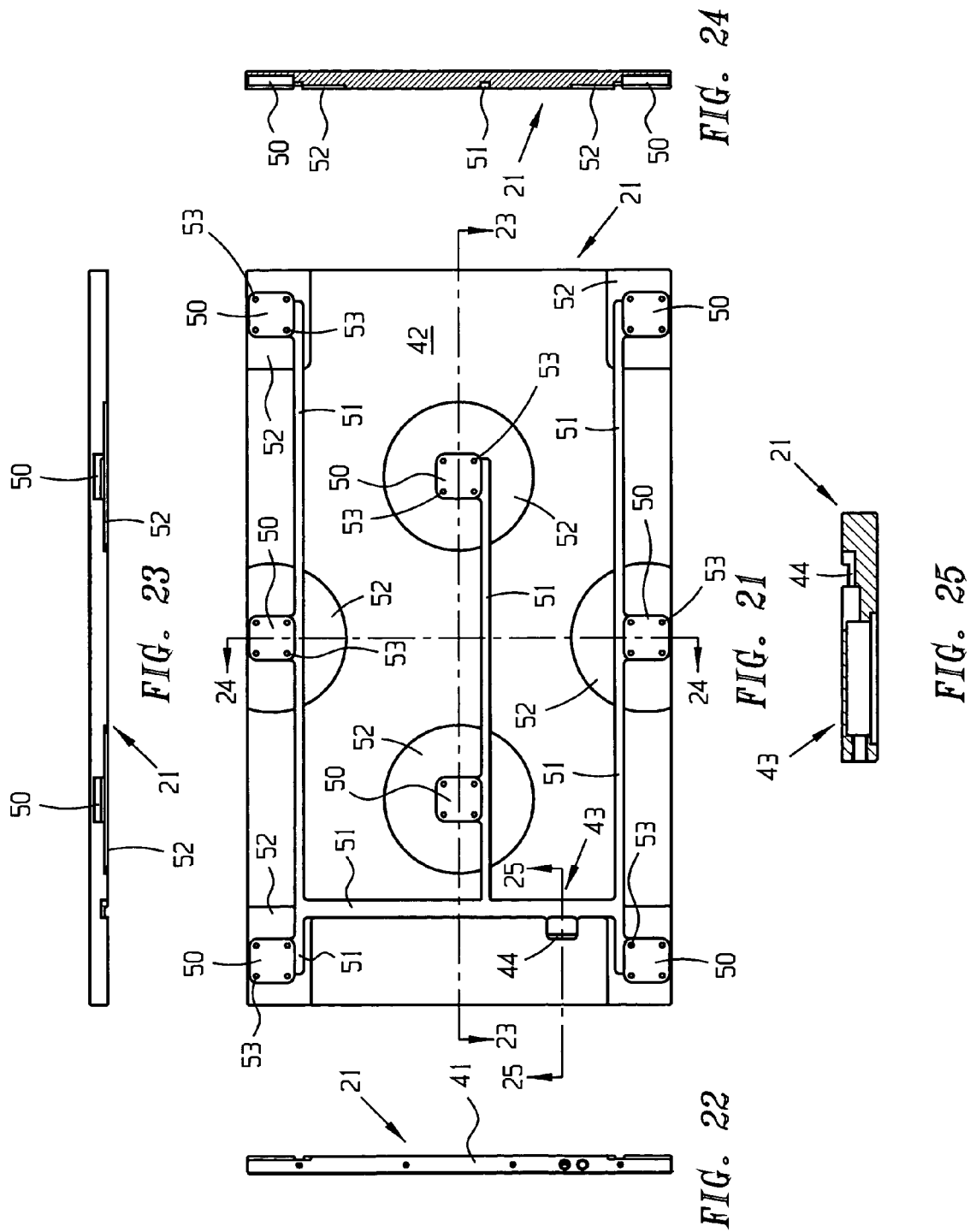

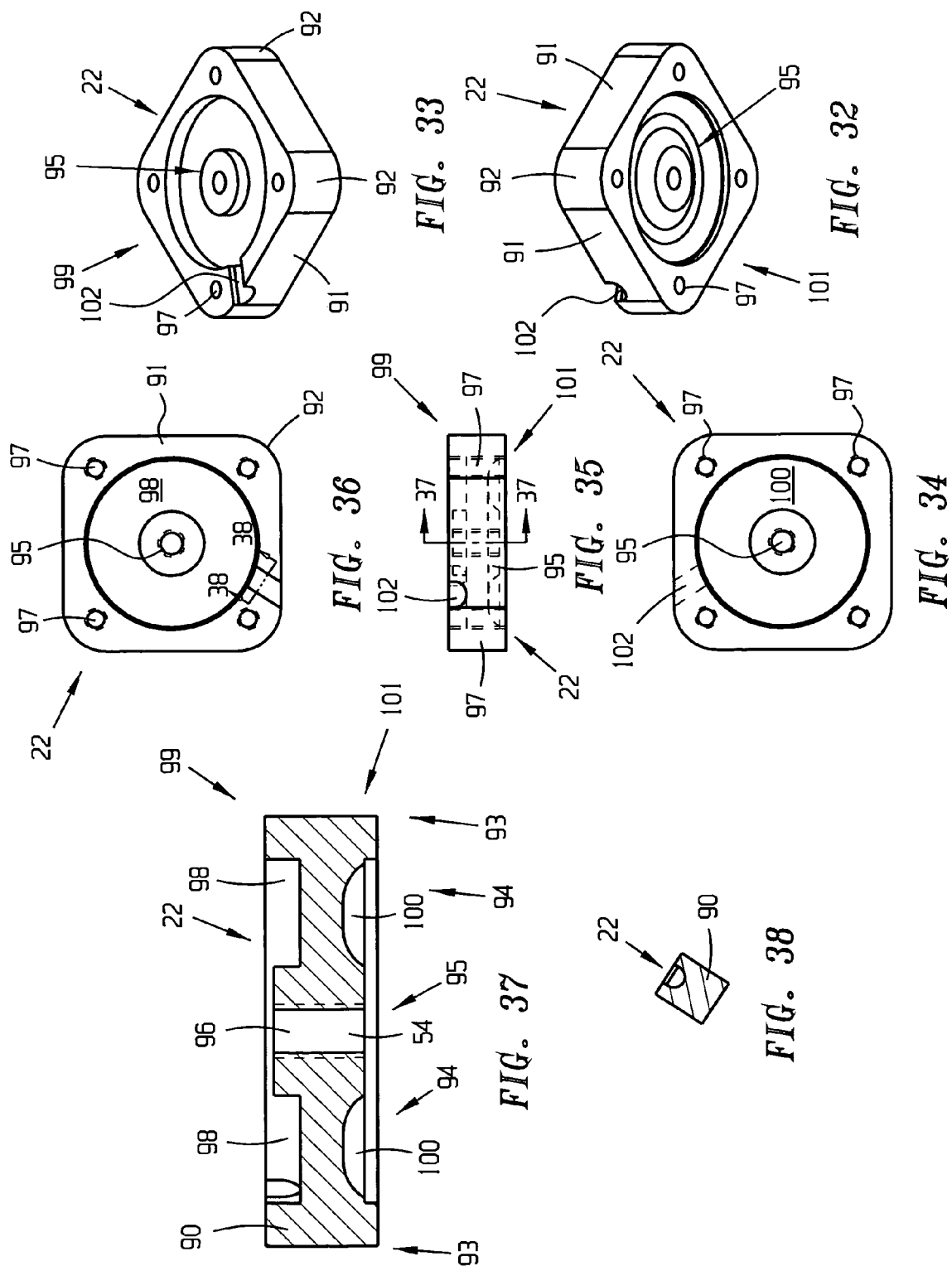

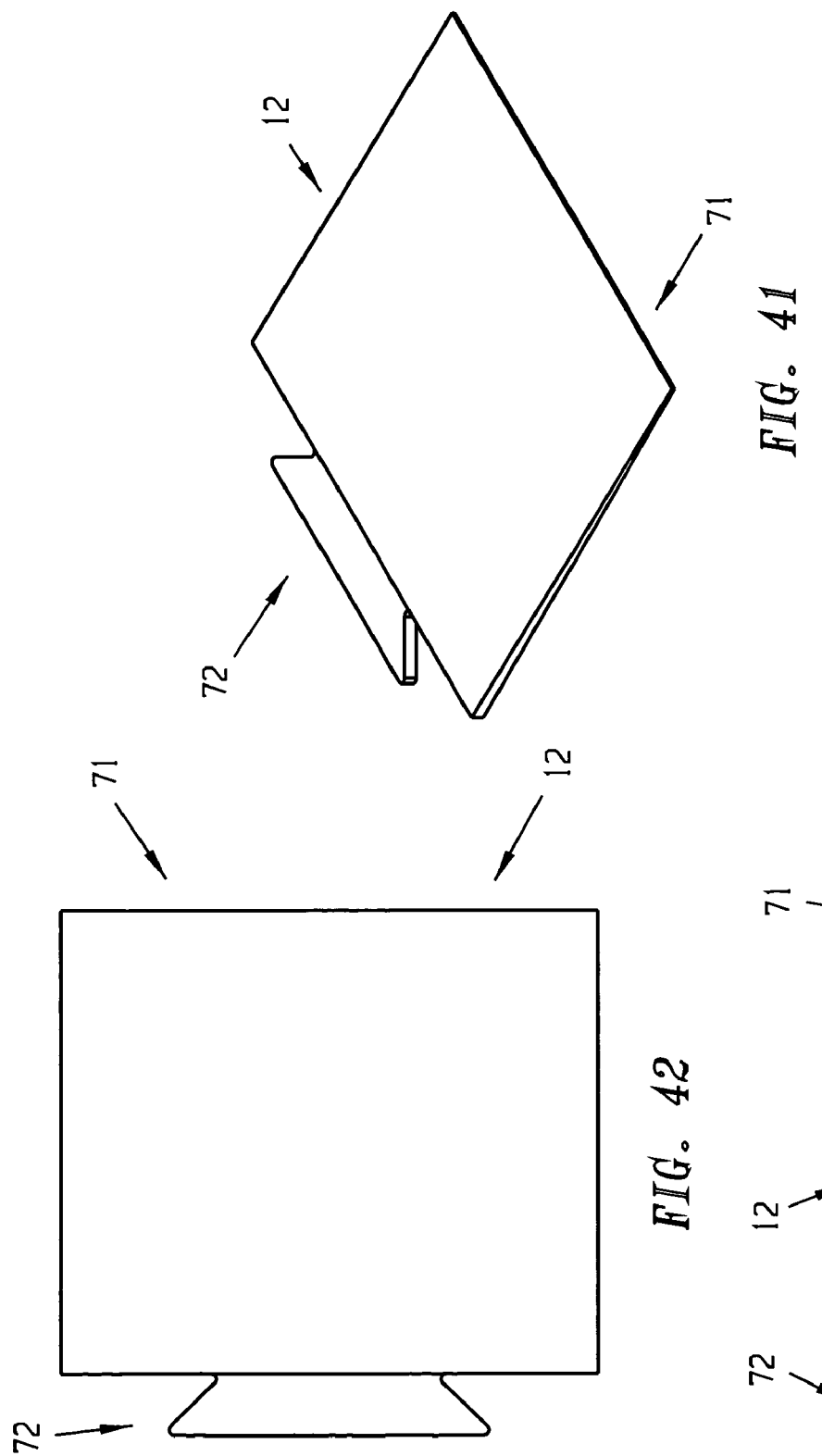

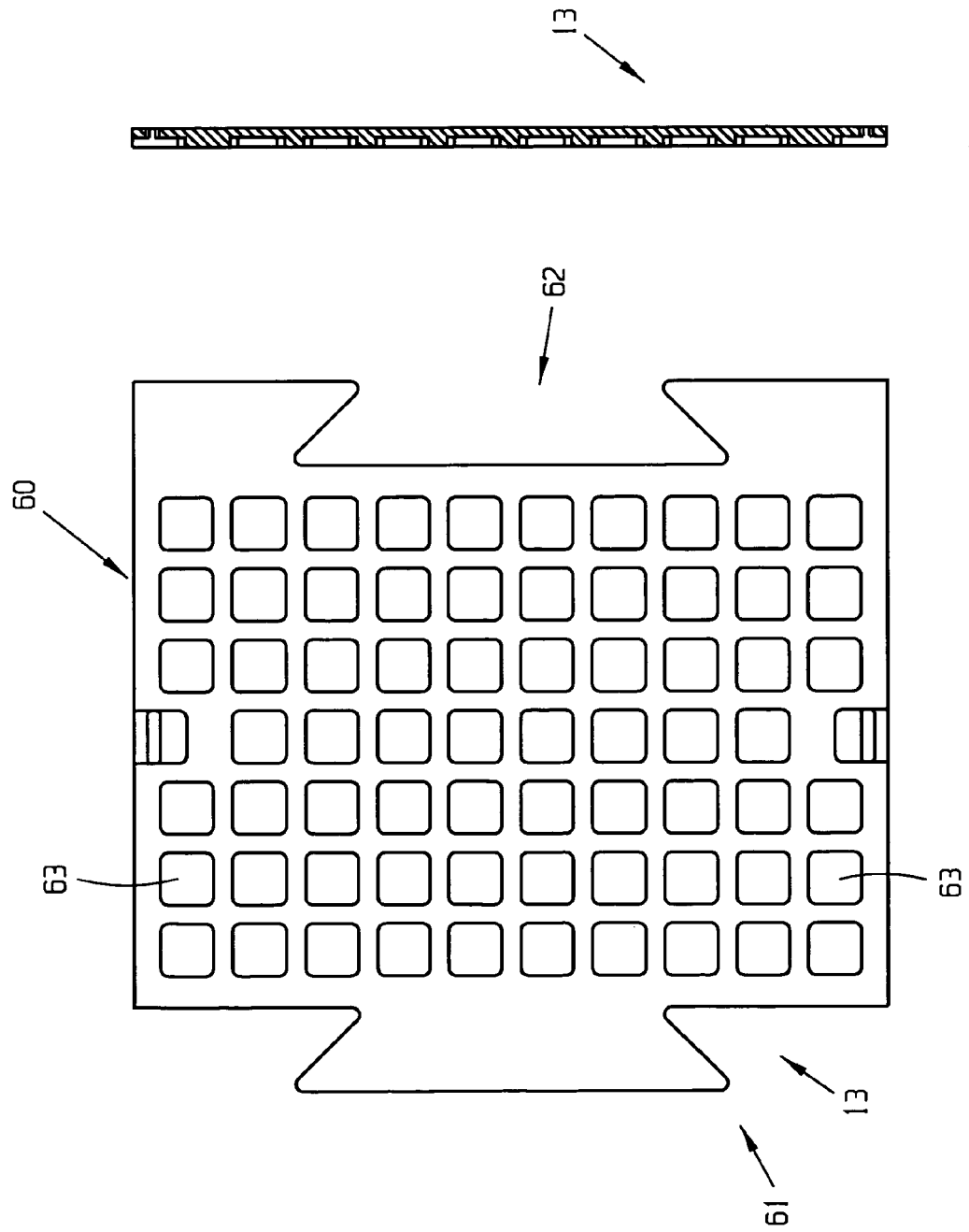

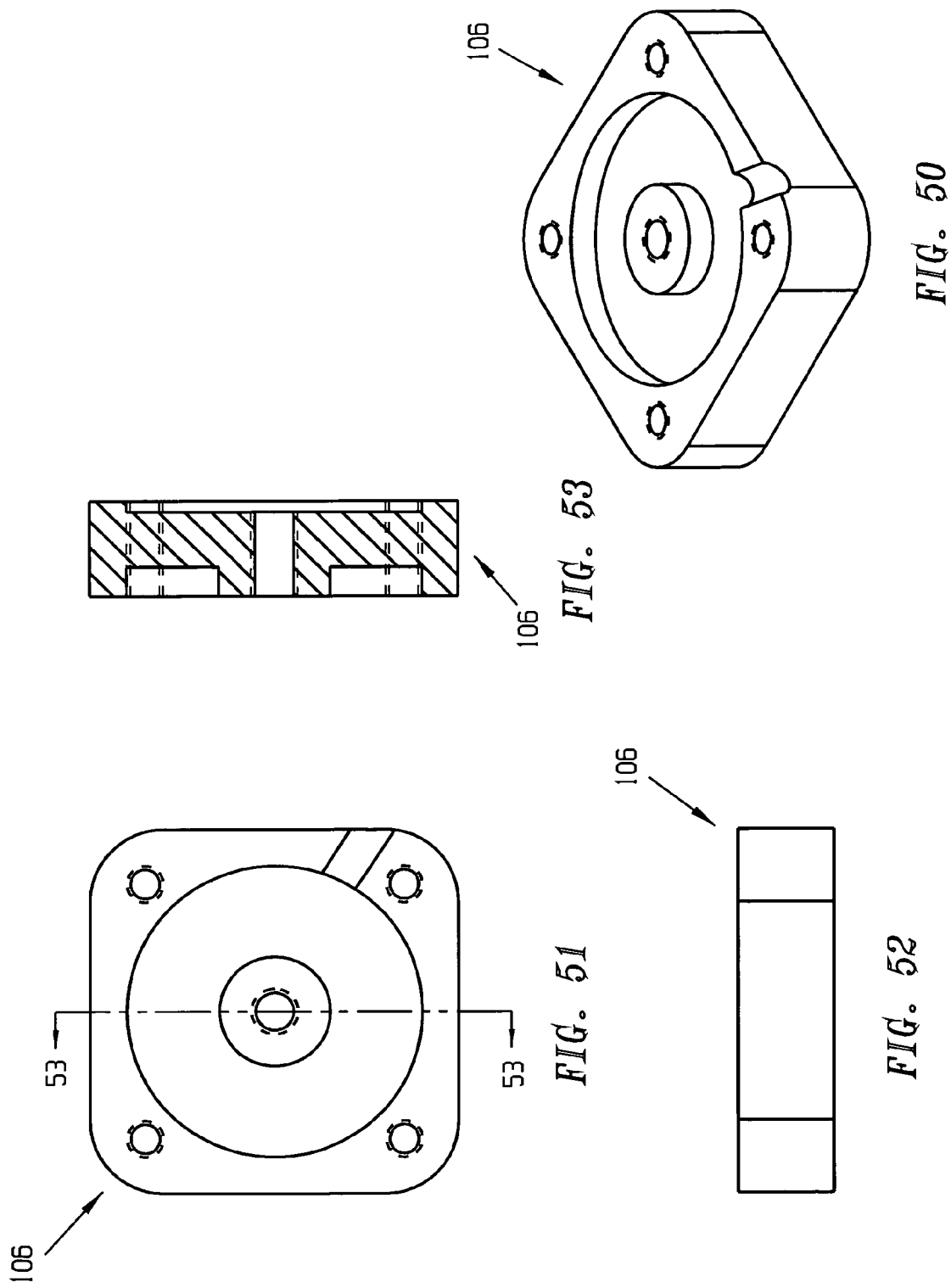

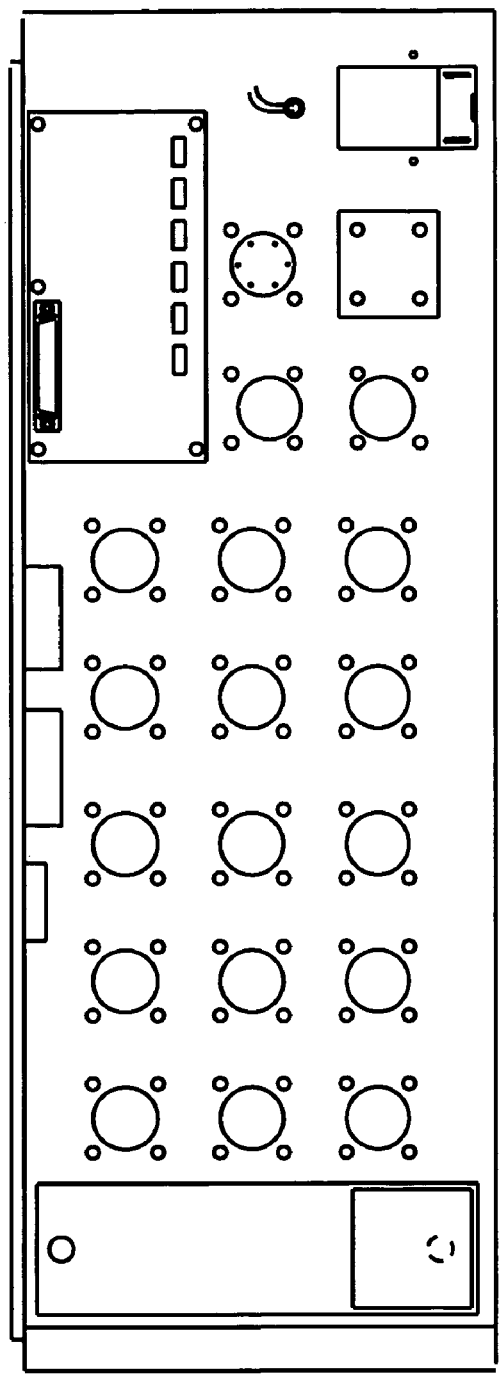
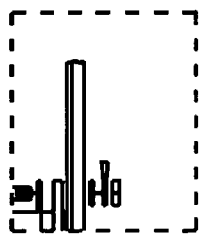
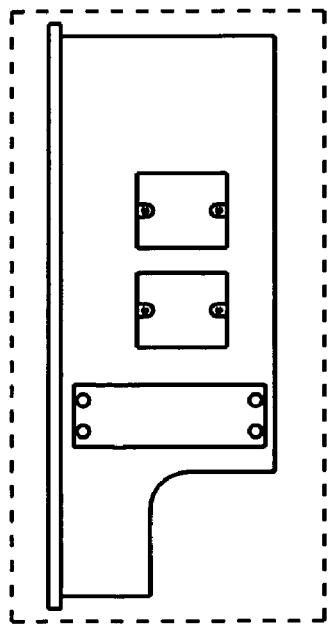
FIG. 60

WEIGH IN MOTION TECHNOLOGY

CROSS-REFERENCE TO RELATED APPLICATIONS, IF ANY

This application claims the benefit under 35 U.S.C. § 119 (e) of co-pending U.S. Provisional Patent Application Ser. No. 60/626,140, filed Nov. 9, 2004, which is hereby incorporated by reference.

37C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field of the Invention

The present invention relates, generally, to weight measurement apparatus and methods. Particularly, the invention relates to an apparatus and method for weighing articles while such articles are moving.

2. Background Information

The state of the art includes various scales and methods of using such scales. The background technology is believed to have significant limitations and shortcomings. For this and other reasons, a need exists for the present invention.

All US patents and patent applications, and all other published documents mentioned anywhere in this application are incorporated by reference in their entirety.

BRIEF SUMMARY

The present invention provides a weighing system, scale apparatus and load cells, and methods of making and using the system, scale and load cells which are practical, reliable, accurate and efficient, and which is believed to fulfil a need and to constitute an improvement over the background technology.

In one aspect, the invention provides a weighing system including:
 a. at least one weighing platform receiving a moving load to be weighed, the platform including at least one scale member connected to at least two approach members, and including at least one ramp member connected to at least one of the approach members;
 b. an interface communicatively connected to the scale member;
 c. a controller connected to the interface; and
 d. a power supply connected to the interface.

In another aspect, the invention provides a weighing scale, comprising:

a. a rigid pad having a top surface for receiving the load and a bottom surface;
 b. a plurality of load cells, each load cell having at least two top surfaces and at least two bottom surfaces, a top surface of each load cell being connected at a predetermined location to the bottom surface of the pad; and
 c. a foot member for contacting the ground and being connected to a bottom surface of the load cell.

In a further aspect, the invention provides a load cell, comprising a body defined by first and second sides, the body having a peripheral region of a predetermined thickness and a central region of a predetermined thickness which is less than that of the peripheral region, the central region being inset on each side with respect to the peripheral region, the central region being adapted for contact with a force.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 9 is a top or plan view thereof.

FIG. 10 is a side elevation view thereof.

FIG. 11 is an end view thereof.

FIG. 12 is a bottom view thereof.

FIG. 13 is an exploded view thereof.

FIG. 14 is a crossectional view thereof taken along line 14-14 of FIG. 9.

FIG. 15 is a crossectional view thereof taken along line 15-15 of FIG. 9.

FIG. 16 is a crossectional view thereof taken along line 16-16 of FIG. 9.

FIG. 17 is a perspective view of an embodiment of a platform or pad of the scale of the invention.

FIG. 18 is a top or plan view thereof.

FIG. 19 is a section view taken along area 19 of FIG. 18.

FIG. 20 is a detailed view of a control box of the platform.

FIG. 21 is a bottom view thereof.

FIG. 22 is an end view thereof.

FIG. 23 is a crossectional view thereof taken along line 23-23 of FIG. 22.

FIG. 24 is a crossectional view thereof taken along line 24-24 of FIG. 22.

FIG. 25 is a crossectional view thereof taken along line 25-25 of FIG. 22.

FIG. 32 is a perspective view of an embodiment of a load cell of the system.

FIG. 33 is another perspective view thereof.

FIG. 34 is a top view thereof.

FIG. 35 is a side view thereof, with hidden portions shown in phantom.

FIG. 36 is a bottom view thereof.

FIG. 37 is a crossectional view thereof taken along line 37-37 of FIG. 35.

FIG. 38 is a crossectional view thereof taken along line 38-38 of FIG. 36.

FIG. 41. is a perspective view of an embodiment of a ramp member of the system of the invention.

FIG. 42 is a top view thereof.

FIG. 43 is a side view thereof.

FIG. 44 is top view of an embodiment of an approach member of the system.

FIG. 45 is an end view thereof.

FIG. 50 is a perspective view of a further embodiment of the load cell of the scale.

FIG. 51 is a plan view thereof.

FIG. 52 is a side elevation view thereof.

FIG. 53 is a crossectional view thereof taken along line 53-53 of FIG. 51.

FIG. 60 illustrates an embodiment of a panel mounting configuration of the system.

DETAILED DESCRIPTION

FIGS. 1-45, show embodiments of systems, apparatus, articles, assemblies, mechanisms, circuitry and processes of the present invention. The embodiments described are intended to be illustrative and not to be exhaustive or limit the invention to the exact forms disclosed. The embodiments are chosen and described so that persons skilled in the art will be able to understand the invention and the manner and process of making and using it.

Figure 1:
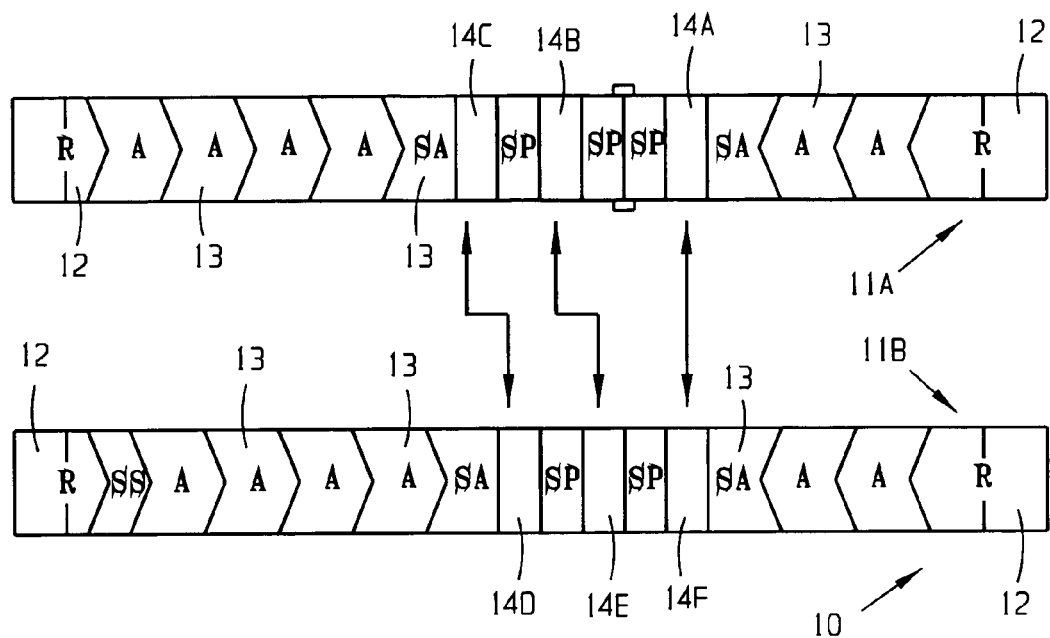
FIG. 1 is a top or plan view of a scale and ramp portion of an embodiment of a weighing system of the present invention, which utilizes six scales.
Figure 2:
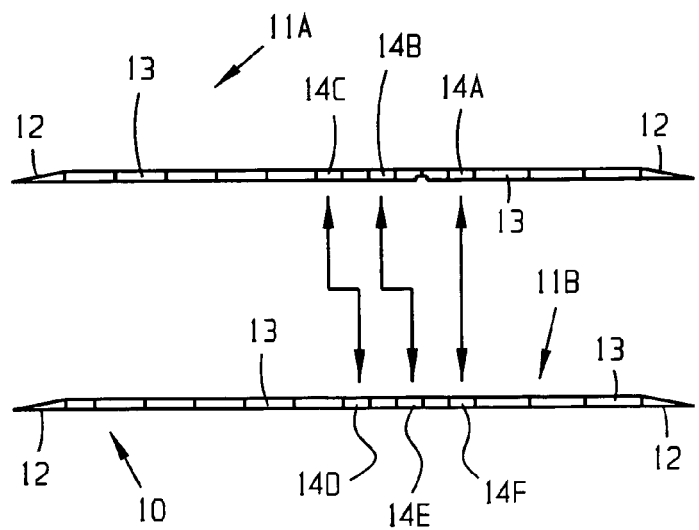
FIG. 2 is a side elevation view of the system shown in FIG. 1.
Figure 3:
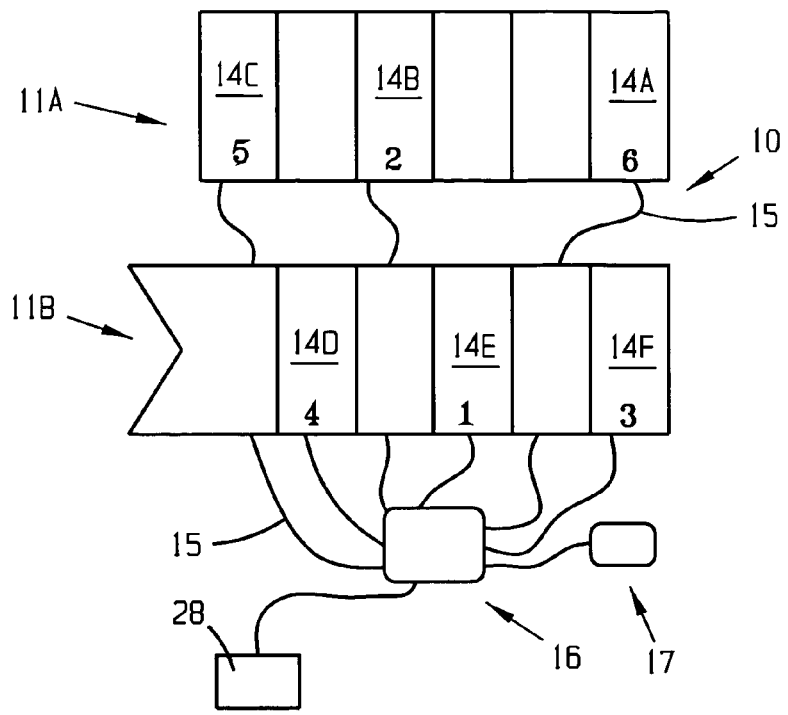
FIG. 3 is top view of an embodiment of an electronic cabling, power and control portion of the weighing system shown in FIGS. 1 and 2.

Referring to FIGS. 1-3 an embodiment of the weighing system 10 is useable to weigh vehicles, vehicle contents or other material, while in motion with respect to the system 10. The system 10 is portable, relatively light weight, and simple to install, break down, move and store. The system 10 includes a pair of wheel platforms or courses 11 a and b of components which are aligned to correspond to the tires or treads of a vehicle (not shown) being weighed. Each course 11 includes a plurality of scales 14 preferably connected to approach members 13 and end ramp members 12. The scales 14 and members 12 and 13 are preferably aligned and connected by releasable means, for example hook and loop fasteners, and have a predetermined length and width. Scales 14a, b and c are shown in course 11a. Scales 14d, e and f are shown in course 11b. As is best shown in FIG. 3, the six (6) scales 14 a-f are configured in a predetermined orientation for controlled in-motion weighing and data processing. The scales 14 are communicatively, preferably electrically, connected via cables 15 to a scale interface box 16, a CPU or other data processing means 17, and a power supply 28.

The CPU 17 is preferably a PC computer, most preferably a portable or laptop lightweight PC. It houses software for controlling the system 10, measuring and storing weight values, and analyzing such values. Exemplary software includes Vehicle Weighing System Software, Commercial Version 1.0 produced by Intercomp Company of Minneapolis, Minn., USA. The CPU has a viewing screen. A printer is preferably connected to the CPU 17 for providing a hard copy of weights and analysis.

Figure 4:
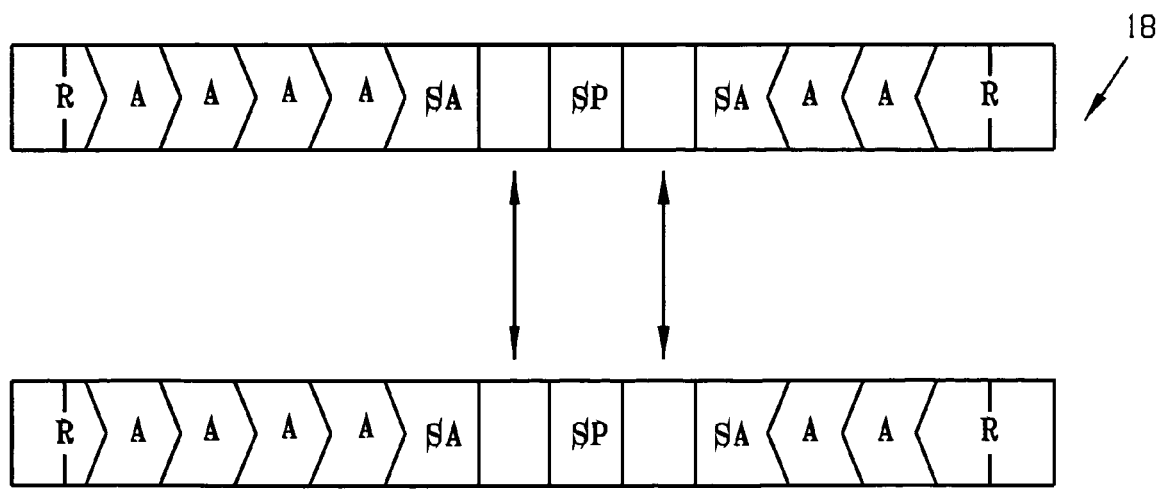
FIG. 4 is a top view of a four scale embodiment of the scale system.
Figure 5:
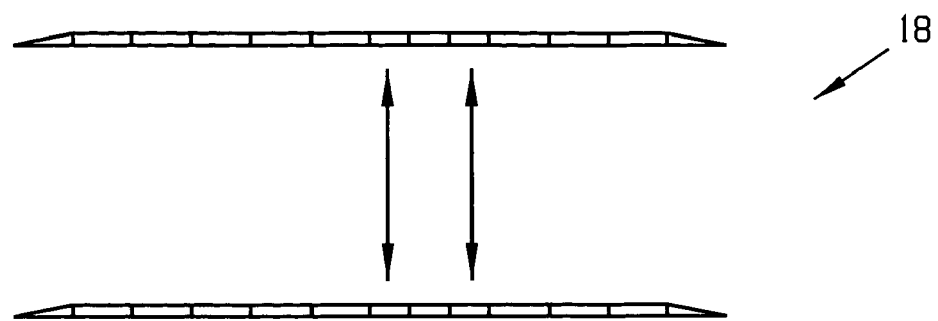
FIG. 5 is a side view of the system shown in FIG. 4.

FIGS. 4 and 5 show an alternative embodiment of the weighing system 18 which utilizes four (4) scales in a predetermined configuration. The components of the system 18 are substantially similar to those of weighing system 10 discussed above.

Figure 6:
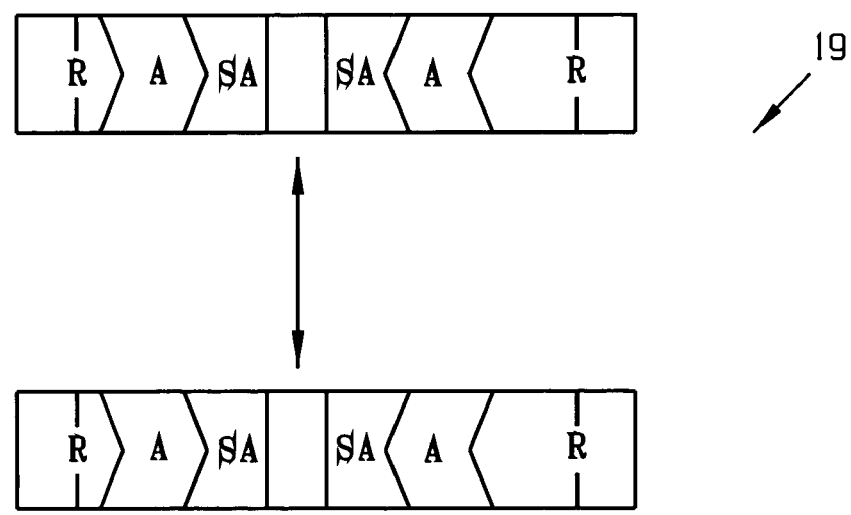
FIG. 6 is a top view of a two scale embodiment of the scale system.
Figure 7:
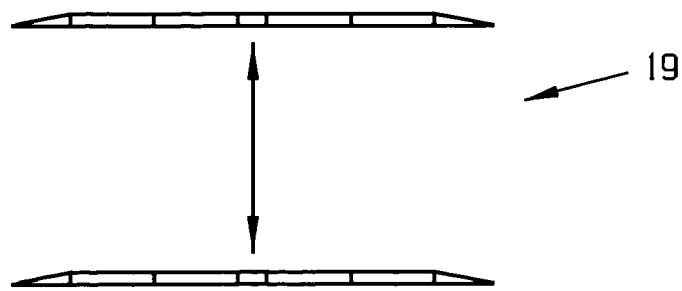
FIG. 7 is a side view of the system shown in FIG. 6.

FIGS. 6 and 7 show an alternative embodiment of the weighing system 19 which utilizes two (2) scales in a predetermined configuration. The components of the system 19 are substantially similar to those of weighing system 10 discussed above.

FIGS. 8-13 show an embodiment of the scale assembly 20 of the present invention. The scale assembly is useable in the weighing systems 1, 18 and 19 described above. The scale is also useable as a stand alone, low profile electronic weighing scale. The scale 20 generally comprises a platform or pad 21, at least one load cell 22 (preferably eight (8) 22 a-h), and a plurality of feet members 23. Foot pins 24, foot straps 25, handles 26, and an on-board control circuit 27 are also preferably included in the scale 20. Handles 26 facilitate transportation of the scales 20. Control circuit 27 may include a summing board, an analog to digital converter, a microprocessor, or a similar component or a combination of such components, and is communicatively connected to interface 16 and CPU 17. Analog summing boards have traditionally been used to correlate the outputs of plural load cells. Alternatively, load cell output may be read individually, digitally converted and processed. It is within the purview of this invention that the load cells 22 may be summed analog or digitally, either on board the scale 20 or externally, for example via the CPU 17.

Referring also to FIGS. 18-25, a preferred embodiment of a pad 21 is a rectilinear, preferably rectangular, member constructed of a rigid material, preferably a metal such as stainless steel or aluminum. Pads 21 are preferably relatively thin so that they have a low profile for ease of traversal and for light weight. They have a flat top surface 40 of predetermined dimensions and area, relatively thin sides 41, and a bottom surface 42. A circuit board housing cavity 43 is disposed in the top surface 40 for containment of the control circuit 27. It is covered by a cover 45. The bottom surface 42 is shown to be substantially flat with a plurality of load cell recesses or cavities 50 of a predetermined rectangular dimension, disposed at corner and predetermined central locations. Load cell screw apertures 53, preferably four (4) each, are located at each recess 50 to permit load cell top screws or fasteners 31b to connect from the top of the pad 21 to a load cell 22 disposed in each cavity 50. A foot cavity or recess 52 of a predetermined rectangular (at corner locations) or circular (at center locations) dimension is aligned with each load cell cavity 50. The dimensions of the foot cavities 52 are larger than or overlap those of the respective load cell cavities 50. Elongated wiring channels or recesses 52 extend from each load cell recess 50 to the control circuit cavity 43 to house electrical wiring connections between the load cells 22 and the control circuit 27. Cavity 43 has an aperture 44 for passage to the channels 51. Channels 52 are preferably covered or enclosed by covers 34. Potting or sealant may also be used.

Figure 8:
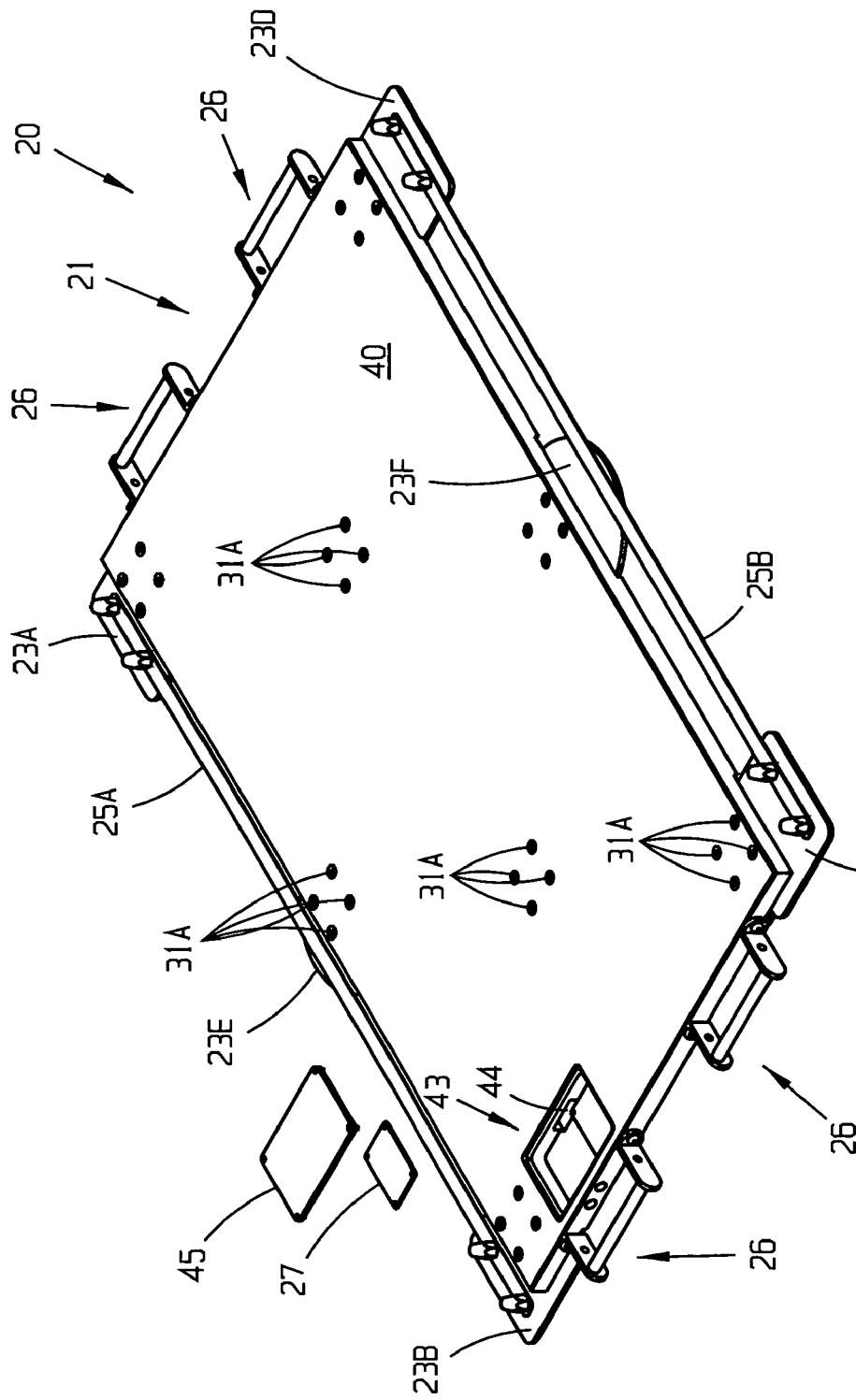
FIG. 8 is a perspective view of an embodiment of a scale of the weigh system of the invention.
Figure 29:
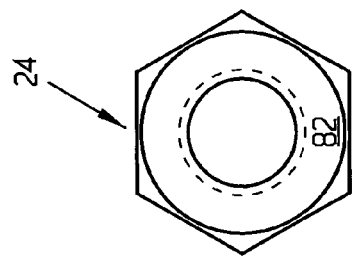
FIG. 29 is an end view thereof.
Figure 27:
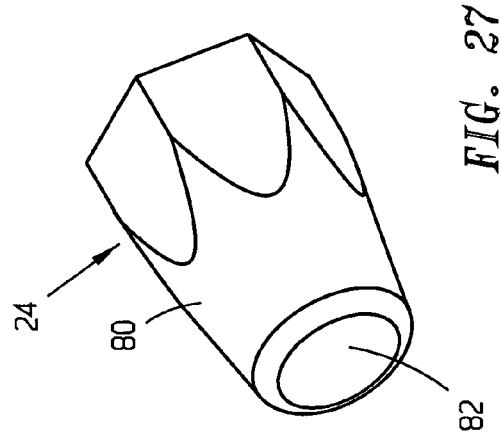
FIG. 27 is another perspective view thereof.
Figure 28:
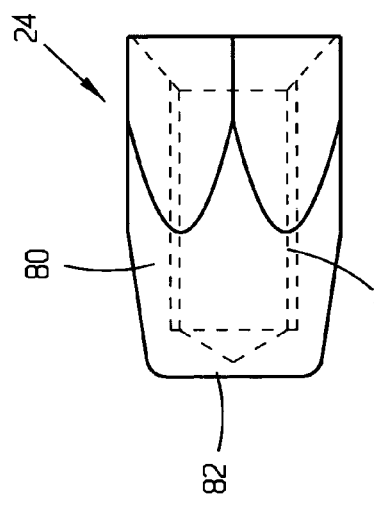
FIG. 28 is a side view, with hidden portions shown in phantom.
Figure 26:
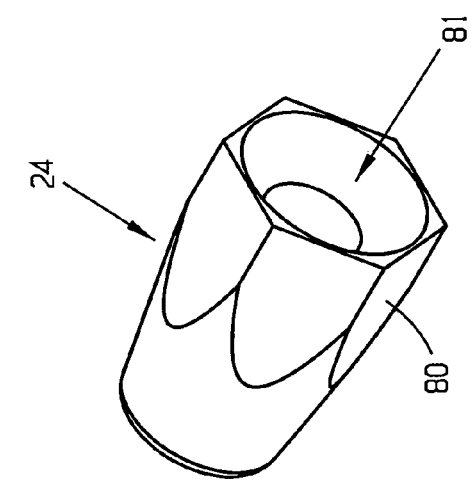
FIG. 26 is a perspective view of an embodiment of a foot pin of the scale.
Figure 30:
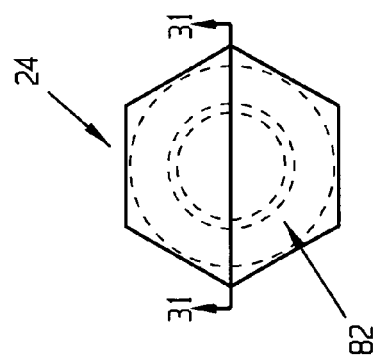
FIG. 30 is an opposite end view thereof.
Figure 31:
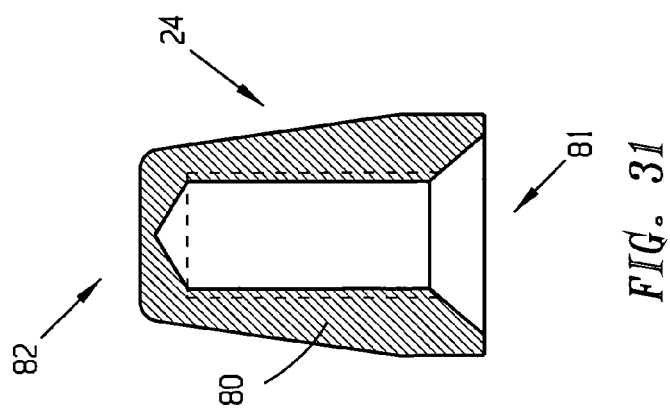
FIG. 31 is a crossectional view thereof taken along line 31-31 of FIG. 30.

As is best shown in FIG. 13, one load cell 22 is disposed in each load cell cavity 50. Each load cell 22 is placed on top of a foot member 23. Lower screw 31b passes through the foot member 23, through lower and upper washers 33b and 33a, through gasket 33 (which aids in sealing the load cell 22 in its cavity 55) and to the bottom of the load cell 22. As was previously discussed, upper screws 31a connect the load cell 22 to the pad 21. As is best shown in FIGS. 8 and 12, feet 23a-d are disposed at corner locations of the scale 20, while feed 323e-h are disposed centrally. The location of the corner feet 23 a-d is such that they extend substantially horizontally outwardly beyond the pad 21. Central feet 23 e and f extend slightly outwardly beyond the pad 21. Referring also to FIGS. 14-16, the horizontal dimensions of the cavity 50 is large enough to contain the load cell 22. The vertical dimension of the cavity 50 is large enough to create clearance space 54 between a central region of the load cell 22 and the bottom of the pad 21. The dimensions of the load cell 22, the bottom screw 31b, washers 33 elevate the bottom of the load cell 22 from the top of the feet 23. Further the dimensions of the foot recess 52 create an additional space 55 between the top of the foot 23 and the bottom of the pad 21.

Turning again to FIGS. 8 and 13, the foot pins 24 are preferably arranged in longitudinally aligned pairs at the corners of the scale 20 and are connected to the feet 23 via screws 30, which also secure ends of rigid, elongated, and longitudinally oriented foot straps 25. The foot pins 24 extend upwardly a predetermined distance from the top surface of the feet 23, preferably so that their top ends are level with the top surface 40 of pad 21. Referring to also to FIGS. 26-31, a preferred embodiment of the foot pins 24 comprises a rigid, strong body 80 with a central threaded aperture 81 for receiving screws 30, and a flat top end 82.

Referring also to FIGS. 32-40, a preferred embodiment of the load cells 22 comprises a body 90, preferably constructed of a metal and having a generally square configuration with flat sides 91 and rounded corners 92. Turning first to FIGS. 32-38, the body 90 has an outer portion 93, a middle portion 94, and a central portion 95 with a central aperture 96. Outer portion 93 has a uniform horizontal dimension or perimeter, and vertical dimension or thickness. Threaded apertures 97 are disposed in outer portion 93 to receive screws 31b. Middle portion 94 is formed by rectilinear cutout surfaces 98 in bottom face or end 99 and curvilinear cutout surfaces 100 in top face 101. Channel 102 permits passage of wiring. Center portion 95 has a vertical dimension or width which is less than that of the outer portion 93 to permit flexing of the center portion 95 with respect to the load cell 22.

Figure 39:
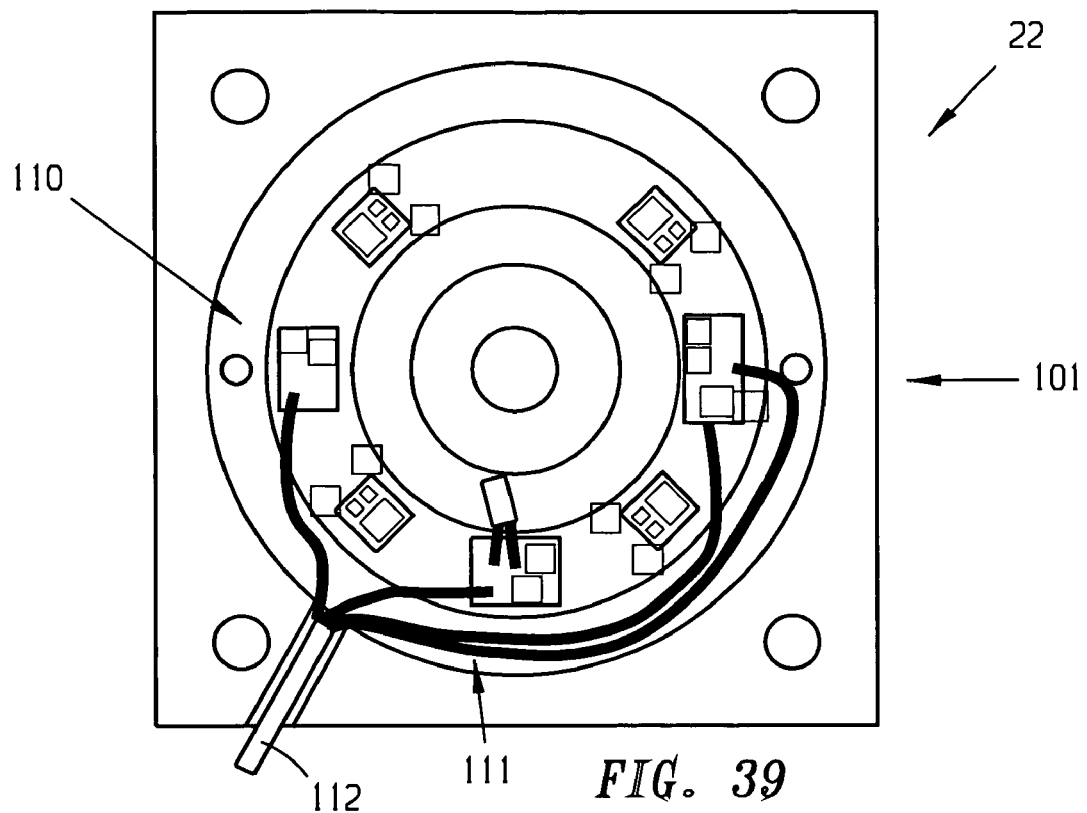
FIG. 39 is a top view of an embodiment of a wiring scheme of the load cell of the invention.
Figure 40:
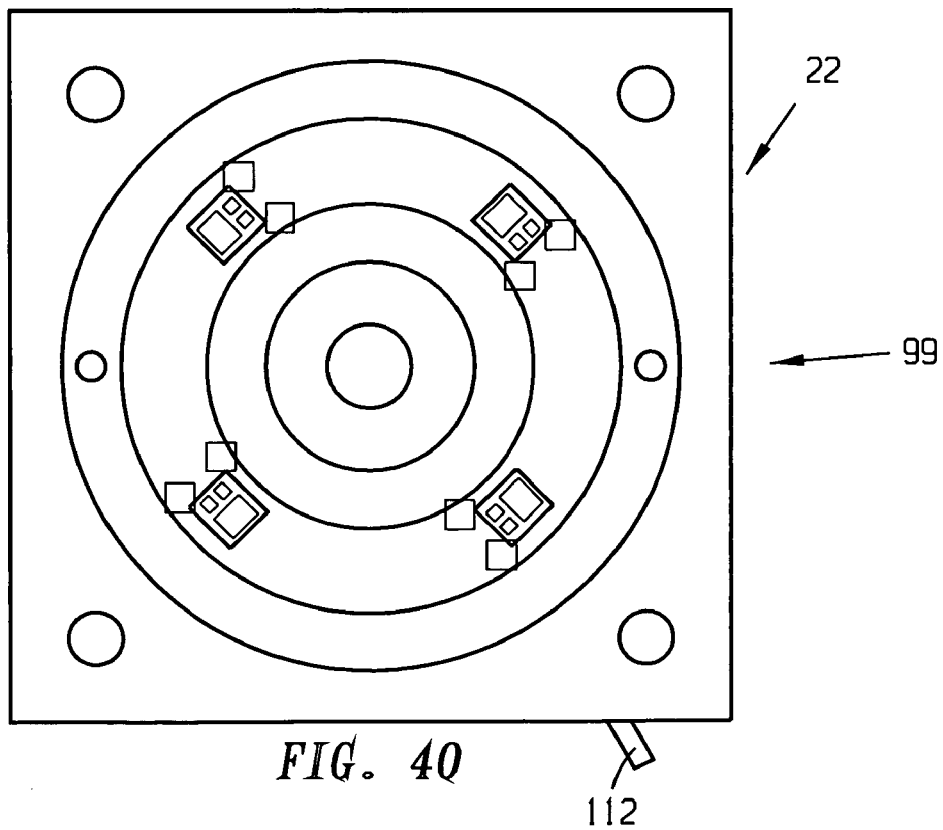
FIG. 40 is bottom view thereof.
Figure 46:
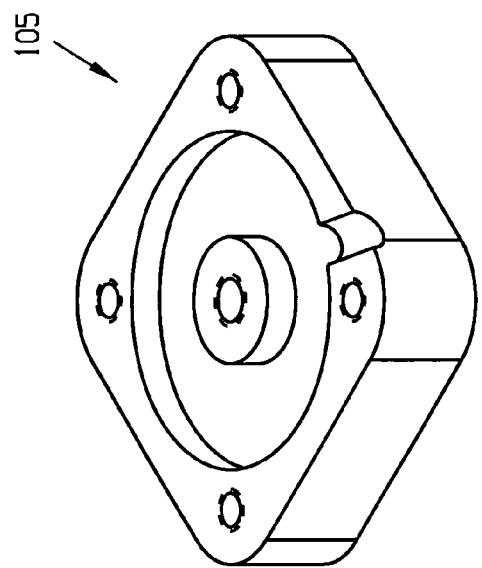
FIG. 46 is a perspective view of an alternative embodiment of the load cell of the scale.
Figure 49:
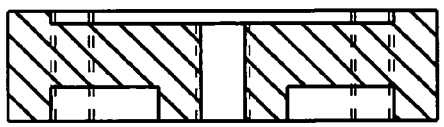
FIG. 49 is a crossectional view thereof, taken along line 49-49 of FIG. 47.
Figure 48:
FIG. 48 is a side elevation view thereof.
Figure 47:
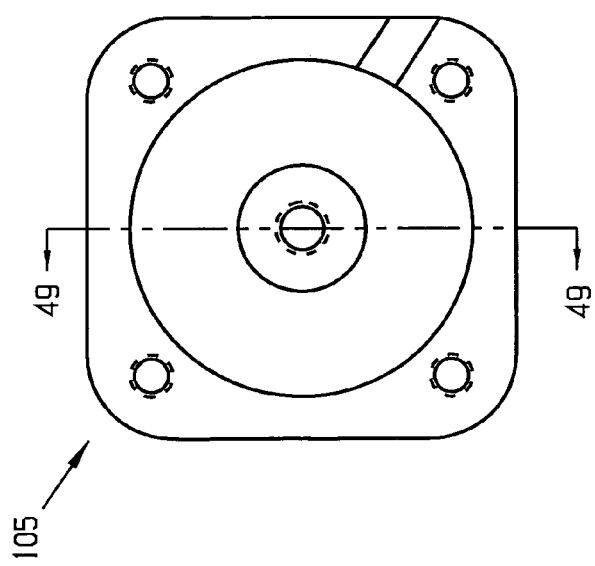
FIG. 47 is a plan view thereof.

Turning next to FIGS. 39 and 40, each load cell 22 preferably has a plurality of force measurement transducers or strain gauges 110 connected at predetermined locations on the exterior of the body 90. The strain gauges 110 are each connected to a wire 111 which is a member of cable 112. Strain gauges convert mechanical forces, for example those existing on and in the load cell 22 at certain states, to electrical signals as is known in the art.

Figure 56:
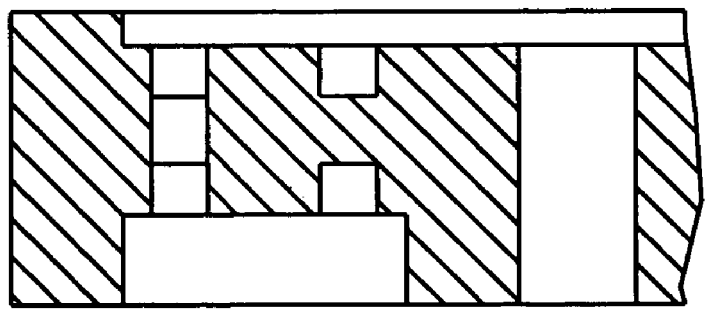
FIG. 56 is a sectional view thereof, taken in region 56 of FIG. 55.
Figure 55:
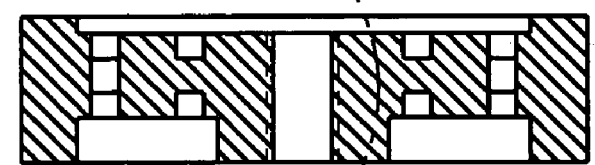
FIG. 55 is a crossectional view thereof taken along line 55-55 of FIG. 54.
Figure 54:
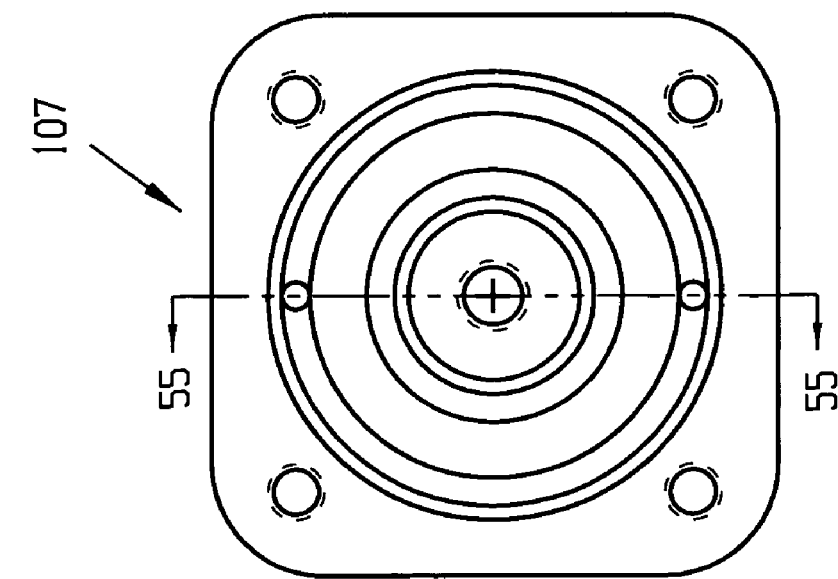
FIG. 54 is a plan view of yet another embodiment of the load cell of the scale.
Figure 57:
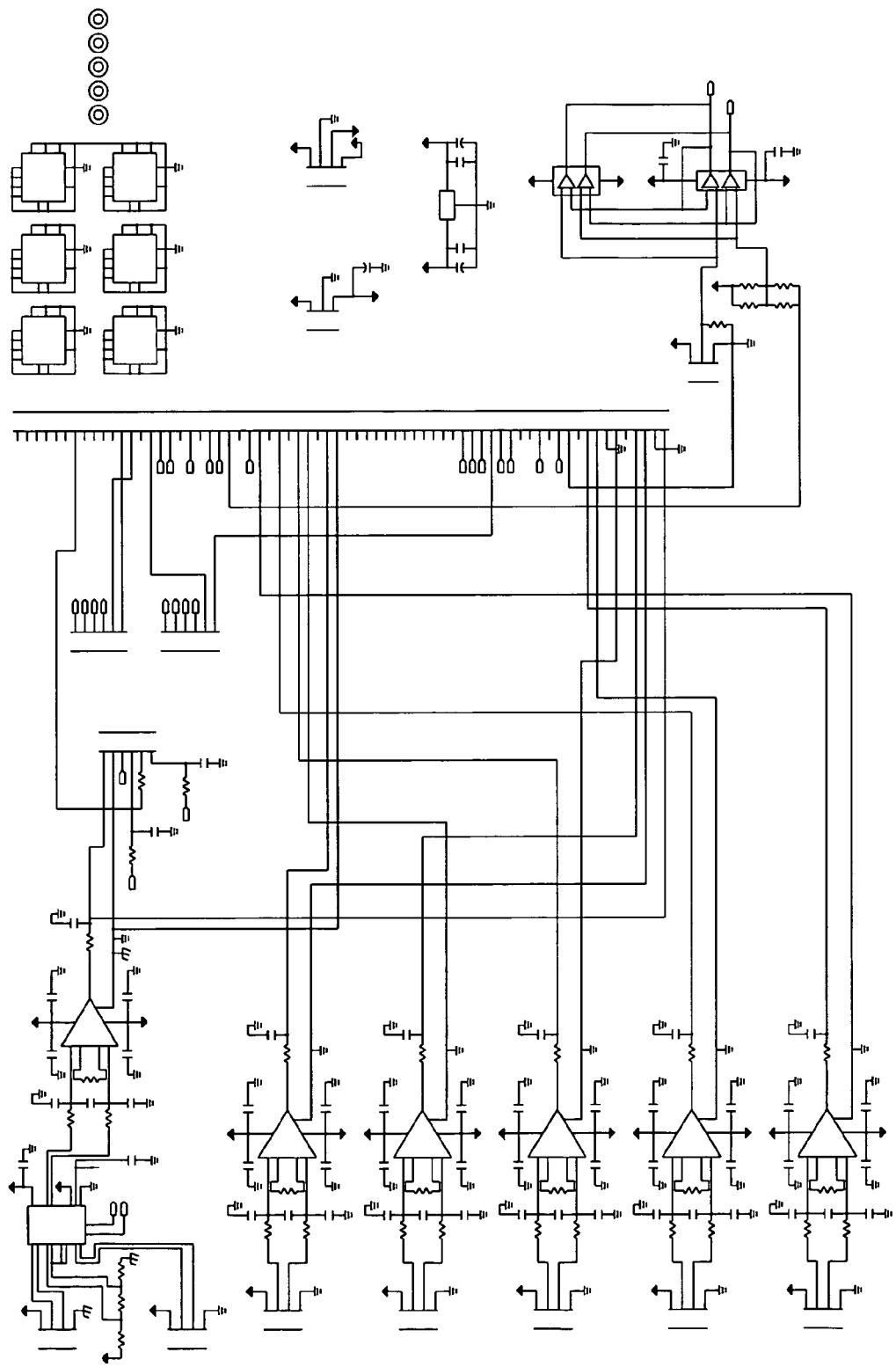
FIG. 57 is a schematic of an embodiment of a DAQ Interface of the system.
Figure 58:
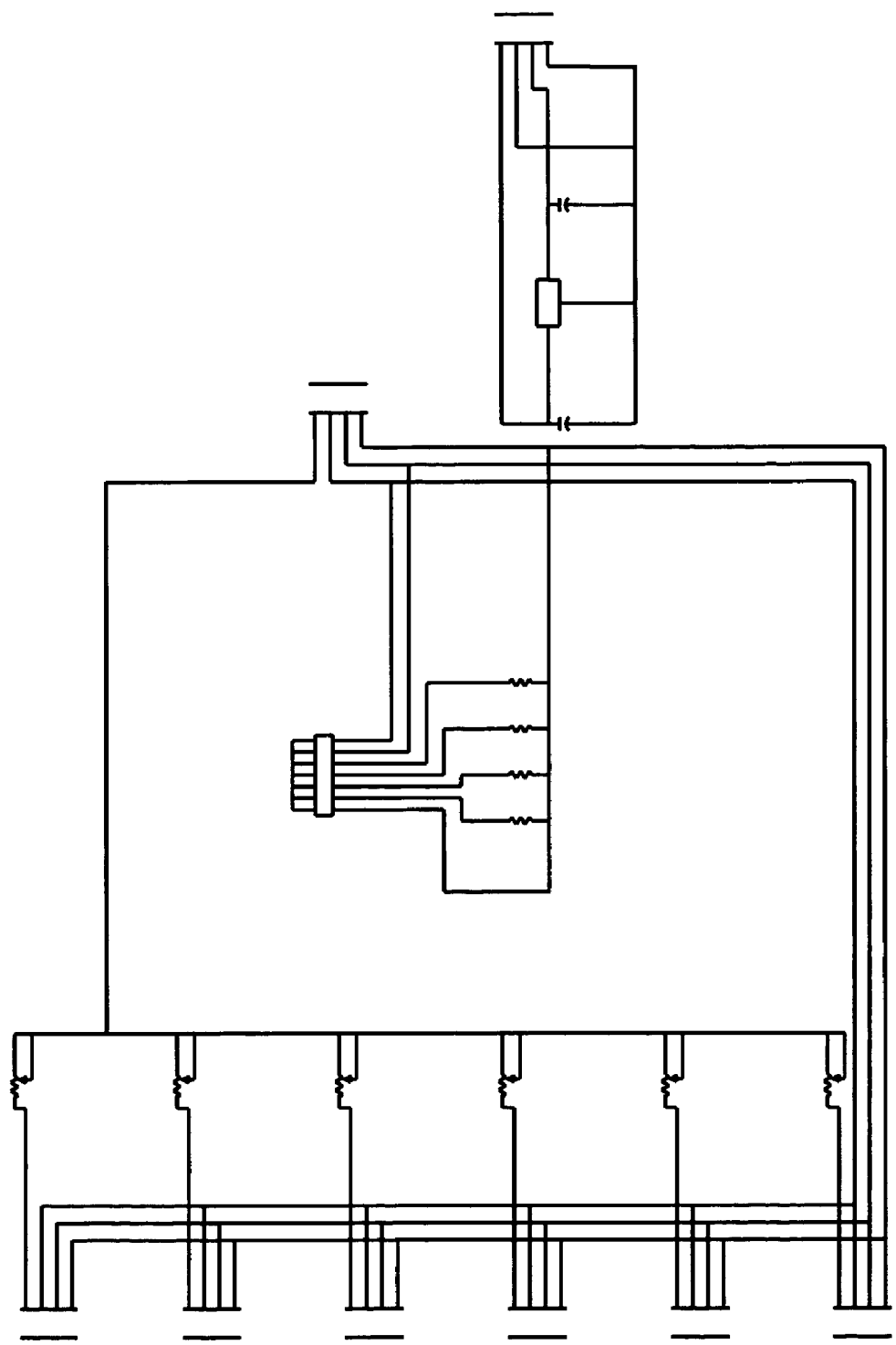
FIG. 58 is a schematic of an embodiment of a summing board of the system.
Figure 59:
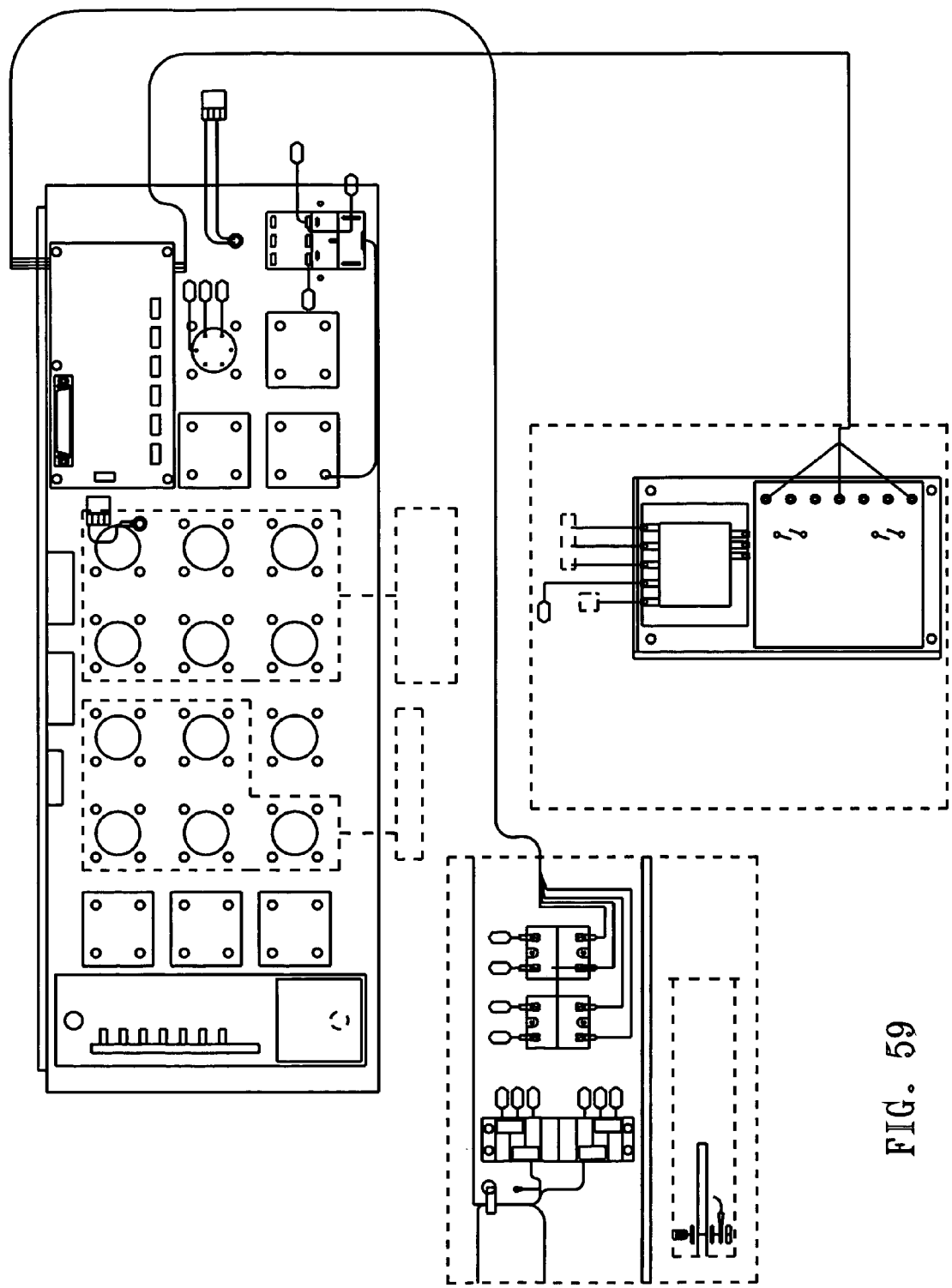
FIG. 59 illustrates an embodiment of a panel wiring configuration of the system.

The load cell may be modified consistent with the general teachings of the invention. FIGS. 46-49 show an alternative embodiment of the load cell 105. FIGS. 50-53 show a further embodiment of the load cell 106. And FIGS. 54-56 show a still further embodiment of the load cell 107.

FIGS. 57-60 are schematics and illustrations of embodiments of a Digital Acquisition (DAQ) Interface, a summing board, a panel wiring configuration of the system, and a panel mounting configuration, respectively, of the system.

FIGS. 41-43 show an embodiment of the ramp 12 of the weighing system 10. Ramp members 12 preferably have a rectangular configuration with a tapered end 71 and are constructed of a strong, rigid light weight material. Ramp members 12 may be constructed of varying lengths and widths. The ramp members 12 preferably have a central base portion 70 with male type 72 elements for interlocking with an adjacent approach 13 members. The ramp 12 preferably has a solid crossectional configuration for maximizing load bearing strength and traction stress tolerance.

FIGS. 44 and 45 show an embodiment of the approach member 13 of the weighing system 10. Approach members 13 preferably have a flat, rectangular configuration and are constructed of a strong, rigid light weight material. Approach member 13 may be constructed of varying lengths and widths. Varying length members 13, for example full and half length members may be used in a system 10 to properly space the scales 14 or 20. The members 13 preferably have a central base portion 60 with male type 61 and female type 62 elements for interlocking with adjacent members. The base 60 preferably has cutout cavities 63 to reduce weight while retaining load bearing strength. Approaches may also be constructed with flat front, rear, or front and rear sides, without mating one or both elements 61 or 62 for use adjacent the flat sides of a scale 14 or 20, or as spacers between scales 14 or 20.

Although the systems, scales, pads and load cells are described in terms of vertical, horizontal, transverse (lateral), longitudinal, and the like, it should be understood that variations from the absolute vertical, horizontal, transverse, and longitudinal are also within the scope of the present invention.

Although the apparatus/method has been described in connection with the field of vehicle weighing, it can readily be appreciated that it is not limited solely to such field, and can be used in other fields including, but not limited to all forms of materials handling and weighing.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A weighing system for weighing objects while the objects are moving comprising:

a. at least one weighing platform receiving a moving load to be weighed, the platform including at least one scale member connected to at least two approach members, and including at least one ramp member connected to at least one of the approach members, each scale member have a travel path and comprise
  i. a rigid pad having a top surface for receiving the load and a bottom surface;
  ii. at least four load cells arranged in two, pairs of load cells aligned laterally with respect to the system travel path, each load cell having at least two top surfaces and at least two bottom surfaces, a top surface of each load cell being connected at a predetermined location to the bottom surface of the pad;
  iii. a foot member for contacting the ground and being connected to a bottom surface of each load cell; and
  iv. at least two rigid foot straps, each foot strap being disposed laterally and fixedly connecting the two foot members of each pair of load cells;
each load cell of each scale member comprising a body defined by first and second sides, the body having;
  i. a peripheral region of a predetermined thickness and first and second side surfaces defining respective first and second peripheral planes,
  ii. a central region of a predetermined thickness which is less than that of the peripheral region and first and second side surfaces defining respective first and second central planes, the first and second central planes being inset a predetermined distance on each side with respect to the first and second peripheral planes; and
  iii. a middle region disposed between the central region and the peripheral region, the middle region having at least one portion with a thickness which is less than that of the central region,
  whereby, one side surface of the peripheral region is adapted for contact directly or indirectly with the ground and whereby the central region is adapted for contact with a force;
b. an interface communicatively connected to the scale member;
c. a controller connected to the interface; and
d. a power supply connected to the interface.

2. The weighing system of claim 1, wherein there are two weighing platforms arranged side by side for receiving the tires or treads of a moving vehicle.

3. The weighing system of claim 1, wherein the scale member comprises a rigid pad having a top surface for receiving the load and a bottom surface, a plurality of load cells, each having at least two top surface and at least two bottom surfaces, a top surface of each load cell being connected at a predetermined location to the bottom surface of the pad, and a foot member for contacting the ground connected to a bottom surface of the load cell.

4. The weighing system of claim 3, wherein a load applied to the pad is translated to the connected top surface of each load cell causing each load cell to bend and output a force measurement signal.

5. The weighing system of claim 4, wherein the scale member has a rectangular configuration with a long side and a short side, the long side of the scale member being aligned with the movement of the load along the platform, and wherein there are eight load cells, one load cell being disposed at each corner of the pad, one load cell being disposed along each long side, aligned and equidistant between the corner load cells, and two load cells being disposed along a central long axis of the scale member.

6. The weighing system of claim 1, wherein the controller has means to measure the weight of the moving load based on signals transmitted from the scale member.

7. The weighing system of claim 6, wherein the means to measure comprises software input, measurement, analysis and output means.

8. The weighing system of claim 1, being portable.

9. A portable weighing scale for weighing objects while the objects are moving along a travel path, comprising:
  a. a rigid pad having a top surface for receiving the load and a bottom surface;
  b. at least four load cells arranged in two pairs of load cells which are aligned laterally with respect to the scale travel path, each load cell having at least two top surfaces and at least two bottom surfaces, a top surface of each load cell being connected at a predetermined location to the bottom surface of the pad;
  c. a foot member for contacting the ground and being fixedly connected to a bottom surface of each load cell; and
  d. at least two rigid foot straps, each foot strap being disposed laterally, extending between the two foot members of each pair of load cells, above the ground, and fixedly connecting the two foot members of each pair of load cells.

10. The scale of claim 9, wherein the pad is thin and has a substantially flat top surface and a bottom surface with a plurality of load cell mounting recesses with predetermined horizontal and vertical dimensions disposed at predetermined locations.

11. The scale of claim 10, further having a foot mounting recess aligned with and extending beyond the dimensions of the load cell mounting recesses.

12. The scale of claim 9, wherein the pad has a rectilinear configuration, and wherein the foot members are disposed at predetermined points along the periphery of the pad.

13. The scale of claim 12, wherein each foot has a predetermined horizontal dimension, and wherein a portion of each foot extends beyond the periphery of the pad.

14. The scale of claim 9, wherein a load applied to the pad is translated to the connected top surface of each load cell causing each load cell to bend and output a force measurement signal.

15. The scale of claim 14, having a rectangular configuration with a long side and a short side, the long side of the scale member being aligned with the movement of the load along the platform, and wherein there are eight load cells, one load cell being disposed at each corner of the pad, one load cell being disposed along each long side, aligned and equidistant between the corner load cells, and two load cells being disposed along a central long axis of the scale member.

16. The scale of claim 9 being connected in a weighing system, comprising:
  a. at least one weighing platform receiving a moving load to be weighed, the platform including at least one scale member connected to at least two approach members, and including at least one ramp member connected to at least one of the approach members;
  b. an interface communicatively connected to the scale member;
  c. a controller connected to the interface; and
  d. a power supply connected to the interface.

17. A combination of a scale and a load cell, the load cell comprising a body defined by first and second sides, the body having;
  a. a peripheral region of a predetermined thickness and first and second side surfaces defining respective first and second peripheral planes,
  b. a central region of a predetermined thickness which is less than that of the peripheral region and first and second side surfaces defining respective first and second central planes, the first and second central planes being inset a predetermined distance on each side with respect to the first and second peripheral planes; and
  c. a middle region disposed between the central region and the peripheral region, the middle region having at least one portion with a thickness which is less than that of the central region,
  whereby, one side surface of the peripheral region is adapted for contact directly or indirectly with the ground and whereby the central region is adapted for contact with a force, and
the load cell being connected in the scale, which comprises:
  a. a rigid pad having a top surface for receiving the load and a bottom surface;
  b. a plurality of said load cells, each load cell having at least two top surfaces, one surface being one side of the central region, and at least two bottom surfaces, one bottom surface being a face of the peripheral region, the top surface of the central region of each load cell being connected at a predetermined location to the bottom surface of the pad; and
  c. a foot member for contacting the ground and being fixedly connected to the bottom surface of the peripheral region of the load cell, and
  d. at least two rigid foot straps, each foot strap being disposed laterally, extending between the two foot members of each pair of load cells, above the ground, and fixedly connecting the two foot members of each pair of load cells.

* * * * *